United States Patent [19]

Lambert et al.

[11] Patent Number: 4,602,080

[45] Date of Patent: Jul. 22, 1986

[54] ORGANIC SALTS OF POLYISOCYANATE DERIVATIVES AND THE PREPARATION THEREOF

[75] Inventors: Pierre M. Lambert, Louvain-la-Neuve; Ignacio De Aguirre-Otegui, Wavre-Limal, both of Belgium

[73] Assignee: Societe Carbochimique en abrege "CARBOCHIM", Belgium

[21] Appl. No.: 507,639

[22] Filed: Jun. 27, 1983

[30] Foreign Application Priority Data

Jun. 29, 1982 [LU] Luxembourg .......................... 84238

[51] Int. Cl.[4] .................. C07D 403/02; C07D 403/14
[52] U.S. Cl. ...................................... 528/67; 544/181; 544/221; 544/222; 525/452
[58] Field of Search ................ 260/239 AR; 544/181, 544/220, 221, 222; 528/67; 525/452

[56] References Cited

U.S. PATENT DOCUMENTS 3,573,259  3/1971  Argabright et al. ................ 544/222
3,625,964  12/1971 Argabright et al. ................ 544/222

*Primary Examiner*—Henry R. Jiles
*Assistant Examiner*—J. G. Mullins
*Attorney, Agent, or Firm*—Sughrue, Mion, Zinn, Macpeak, and Seas

[57] ABSTRACT

This invention relates to new salts of organic polyisocyanates containing at least one isocyanurate ring carrying a negative charge and at least one non-metal ion having a positive charge, these new salts being organic salts of mono- or polyisocyanurates containing at least two free isocyanate functions.

The new organic salts according to this invention may be represented by the following general formula (I)

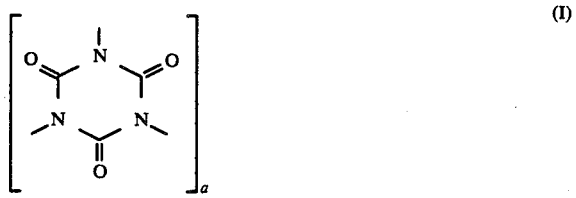
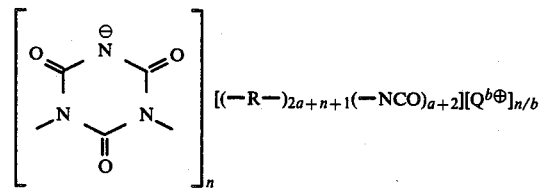

(I)

$$[(-R-)_{2a+n+1}(-NCO)_{a+2}][Q^{b\oplus}]_{n/b}$$

in which R is a bivalent aliphatic, cycloaliphatic, aromatic or heterocyclic radical which may be substituted, Q is an onium cation substituted by four identical or different radicals which may be aliphatic, cycloaliphatic, aromatic or heterocyclic possibly substituted radicals, a is the average number of molecular isocyanurate rings which may be equal to zero or to more than zero, b is the number of tetrasubstituted heteroatoms of Q which is of at least 1 and n is the average number of ionic isocyanurate rings which is of at least 1.

19 Claims, No Drawings

ORGANIC SALTS OF POLYISOCYANATE DERIVATIVES AND THE PREPARATION THEREOF

The invention also relates to a process for preparing the new salts of organic polyisocyanates of the formula I, in which a tetrasubstituted onium cyanate is reacted with an organic polyisocyanate or with a 1,3-bis-(isocyanatoaryl)uretidinedione.

PRIOR ART

Molecular polyisocyanurates containing three isocyanate functions prepared by trimerisation of polyisocyanates are known.

Metal salts of polyisocyanates containing ionic isocyanurate rings are also known. Particularly, U.S. Pat. No. 3,573,259 describes the preparation of such metal salts from organic diisocyanates and from alkaline or alkaline-earth cyanates, preferably at temperatures comprised between 10° and 175° C.

A drawback of the process described in this U.S. Pat. No. 3,573,259 is that it can only be effected in aprotic solvents having, at 25° C., a dielectric constant of more than 15; an other drawback of this process is that it can only be effected in a suspension.

Moreover, this known process only produces polymers having a molecular weight of less than 2,000; in a particular example, the product obtained from 2,4-tolylenediisocyanate and from sodium cyanate in dimethylformamide has a molecular weight of less than 1,000.

Metal monoisocyanurates containing no free isocyante functions are also known. Particularly, U.S. Pat. No. 3,625,964 describes the preparation of metal salts of monoisocyanurates of the following formula A from 1,3-diaryluretidinediones and from metal cyanates according to the following reaction:

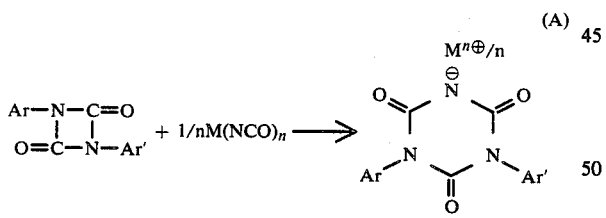

(A)

in which Ar and Ar' represent aromatic radicals which may be substituted by nitro, methoxy, methyl, chloro, bromo or iodo substituents; M represents an alkalin or alkalin-earth metal and n is the oxydation number of the metal. This process can also only be carried out in aprotic solvents having a dielectric constant of more than 15 at a temperature of 25° C.; moreover, this process can only be carried out in suspension.

This known process is furthermore limited to the use, as starting reagents, of 1,3-diaryluretidinediones which do not contain, as substituents, free isocyanate functions which may interfere with the basic reaction of the process and may reduce the selectivity in compounds of formula A.

BRIEF DESCRIPTION OF THE INVENTION

This invention relates to new organic salts of polyisocyanates containing at least one isocyanurate ring having a negative charge and at least one on metal ion having a positive charge, these new salts being represented by the following general formula (I):

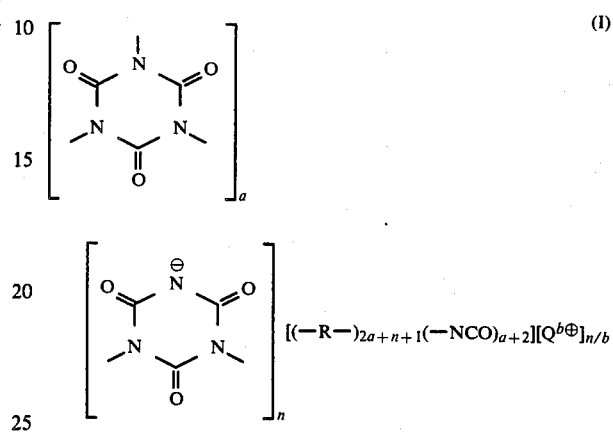

in which R is an aliphatic, cycloaliphatic, aromatic or heterocyclic bivalent radical which may possibly be substituted, Q is an onium cation tetrasubstituted by four identical or different radicals which may be aliphatic, cycloaliphatic, aromatic or heterocyclic radicals which may be possibly substituted, a is the average number of molecular isocyanurate rings which may be equal to zero or have a value of more than zero, b is the number of tetrasubstituted heteroatoms of Q which is of at least 1 and n is the average number of ionic isocyanurate rings which is of at least 1.

In the compounds of formula (I) according to the invention, a may reach a value of about 500, b is preferably equal to 1, but may have a value reaching about 100 and n may reach a value of about 3000.

Among the compounds of formula (I), the classes of new compounds in which Q represents either a radical of the following formula (II):

$(R^I R^{II} R^{III} X)_b R^{IV}$ in which X is nitrogen, phosphorus or arsenic, $R^I$, $R^{II}$, $R^{III}$ and $R^{IV}$ which are identical or different represent alkyl, aryl or arylalkyl radicals which may be substituted, and $R^I$ may also form together with $R^{II}$ a bivalent radical which may be substituted and b has the above meaning:
or a radical of the following formula (III):

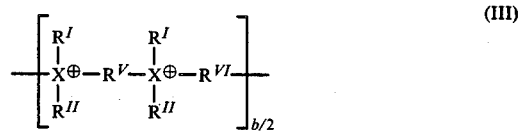

in which X, $R^I$ and $R^{II}$ have the above meanings, $R^V$ and $R^{VI}$ are bivalent radicals and b has the above meaning, can be cited.

Thus the invention covers the classes of compounds represented by the following general formulae (IV) and (V):

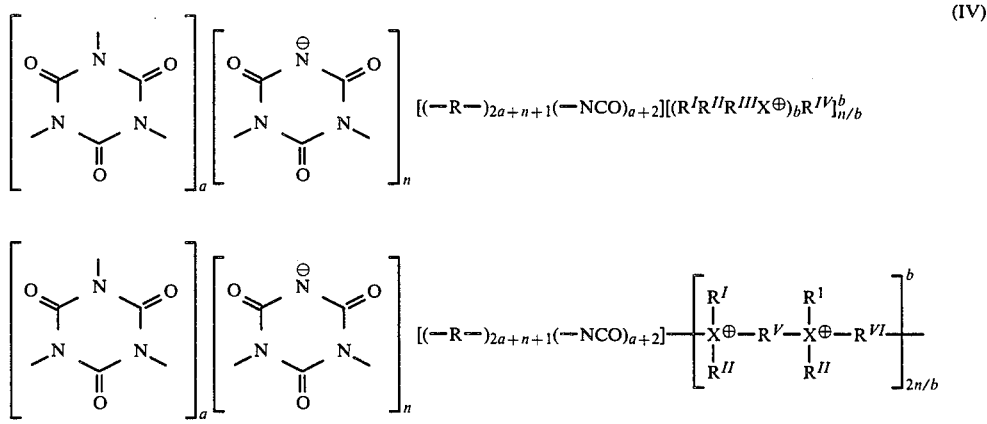

in which R, X, $R^I$, $R^{II}$, $R^{III}$, $R^{IV}$, $R^V$, $R^{VI}$, a, n and b have the above meanings.

In a more particular embodiment, of the new compounds of the formulae (IV) and (V), R is preferably an aromatic radical which may be substituted, such as tolyl radical, whereas $R^I$, $R^{II}$, $R^{III}$, $R^V$, $R^{VI}$ and possibly $R^{IV}$ are preferably $C_2$-$C_{12}$ alkyl radicals.

This invention relates also to new organic salts of polyisocyanates of the formula (I), in which at least a part of the ionic isocyanurate rings and/or of the free isocyanate functions are functionalized.

The new compounds according to this invention may be used for preparing polyurethane, as intermediates in chemical synthesis and for complexing metal ions (for example for purifying liquid polluting effluents); moreover, the compounds according to the invention having one of the formulae I, IV and V, can be easily functionalized, due to the presence of free isocyanate functions and of charged isocyanurate rings and due to their solubility in organic solvents.

This invention also relates to a process for the preparation of the new compounds represented by the formulae (I), (IV) and (V).

According to this invention, these new compounds are prepared by reacting an onium cyanate of the following general formula (VI):

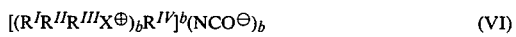

or of the following general formula (VII):

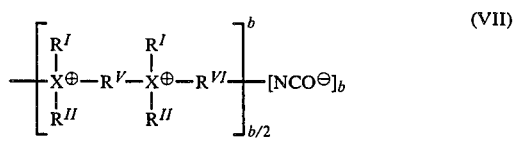

(quaternary polyonium cyanates of the "ionene" type) in which X, $R^I$, $R^{II}$, $R^{III}$, $R^{IV}$, $R^V$, $R^{VI}$ and b have the above meanings with a compound selected from the organic polyisocyanates of the general formula (VIII):

in which R has the above meanings and m is equal to 2 or has a value of more than 2, and the 1,3-bis-(isocyanatoaryl)uretidinediones having the following general formula (IX):

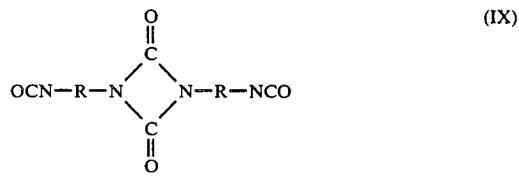

in which R represents an aryl radical.

In a particular embodiment of the process according to this invention, a tetrasubstituted ammonium, phosphonium or arsonium cyanate is reacted at a temperature comprised between $-20°$ C. and $100°$ C. with 0.2 to 10 moles of an organic diisocyanate per mole of onium cyanate, in the presence of 0.05 to 2 liters, per mole of diisocyanate, of an inert organic solvent during 0.5 minute to 48 hours.

The organic polyisocyanate of the formula (VIII) may be a diisocyanate represented by the following formula (IX):

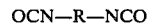

in which R represents an aliphatic, cycloaliphatic, aromatic or heterocyclic bivalent radical which may be substituted, or may be a mixture of such diisocyanates.

Examples of isocyanates which may be used in the process according to this invention are p-phenylene diisocyanate, toluene, 2,4-diisocyanate (TDI), toluene, 2,6-diisocyanate (TDI), methylene di-p-phenylene diisocyanate (MDI) or the polymers thereof (PAPI), naphthylene 1,5-diisocyanate, stilbene 4,4'-diisocyanate, m-xylylene diisocyanate, isophorone diisocyanate, hexamethylene diisocyanate, 2,2,4-trimethylhexamethylene diisocyanate, butene 1,4-diisocyanate or the mixtures thereof. The best results are obtained with the aromatic diisocyantes.

Examples of 1,3-bis(isocyanatoaryl)uretidinediones which may be used in the process according to this invention are the 1,3-bis(3-isocyanato-4-methyl-phenyl-)uretidienedione and 1,3-bis(4-isocyanatophenyl)uretidinedione having the respective following formulae (X) and (XI):

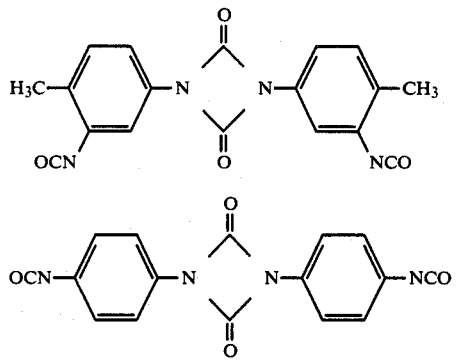

Examples of monovalent onium cyanates which may be used in the process according to this invention are tetramethylammonium cyanate, tetraethylammonium cyanate, tetrapropylammonium cyanate, tetrabutylammonium cyanate, tetraamylammonium cyanate, tetrahexylammonium cyanate, tributylmethylammonium cyanate, tricaprylmethylammonium cyanate, benzyltrimethylammonium cyanate, benzyltriethylammonium cyanate, benzyltributylammonium cyanate, dodecyltrimethylammonium cyanate, benzylisopropyldimethylammonium cyanate, benzyltripropylammonium cyanate, phenyltrimethylammonium cyanate, phenyltriethylammonium cyanate, methyltributylphosphonium cyanate, tetrabutylphosphonium cyanate, tetraphenylphosphonium cyanate, benzyltriethylarsonium cyanate, tetrapropylarsonium cyanate, tetraphenylarsonium cyanate, dimethylpiperidinium cyanate and methylpyridinium cyanate.

Examples of polyvalent onium cyanates which may be used in the process according to this invention are the 1,4-bis(trimethylammonium)butane cyanate, the 1,6-bis(triethylammonium)hexane cyanate, the 1,4-dimethyl-1,4 diaza-2,2,2 bicyclo-octane cyanate, the cyanates fixed on a anionic resin of the AMBERLITE IRA 400 (FLUKA) type, the ionene of the following formula (XII):

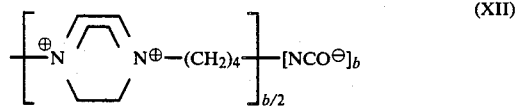

and the ionene of the following formula (XIII):

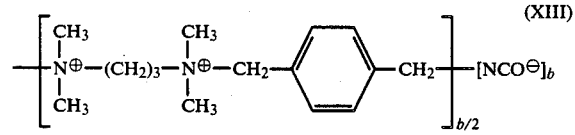

in which b is comprised between 5 and 40, or the mixtures of these compounds.

It is also possible to use mixtures of the above cyanates and substituted derivatives of these cyanates which do not interfere with the reaction.

The onium cyanates may possibly be prepared in the reaction solvent, prior or during the preparation of the desired compounds, by any known method.

The process according to this invention may be carried out in a non-polar or polar solvent, i.e. a solvent having a dielectric constant of less than 15 or more than 15. The process according to this invention may also be carried out in the absence of any solvent.

The solvents used in the process according to this invention may be polar or non-polar solvents, provided they are liquid at the reaction temperature and inert for the reagents under the operating conditions. It is preferred to use the solvents in which the reagents are soluble from the start of the reaction or after about 5 minutes of reaction. The term "soluble" means that the reagents are soluble in the solvent in a amount of more than 10 grams per kg of solvent. It has surprisingly been found that the new compounds of formula (I) having a high molecular weight, containing a great number of ionic isocyanurate rings and soluble in the reaction mixture are best prepared in solvents having a dielectric constant of less than 15 at a temperature 25° C. However, it is possible to use solvents having a higher dielectric constant. The selection of the solvent depends from the nature and the features of the desired product.

Examples of solvents which may be used in the process according to this invention are carbon tetrachloride, chloroform, dichloromethane, 1,2-dichloroethane, 1,1-dichloroethane, 1,2-dichloroethylene, o-dichlorobenzene, dimethoxyethane, dioxane, ethyl acetate, tetrahydrofurane, toluene, α-methylnaphthalene, acetone, dimethylformamide or the mixtures thereof.

The amount of solvent per mole of isocyanate may vary and is preferably comprised between 0.05 and 2 liters of solvent per mole of isocyanate.

Moreover, the reaction of the process according to this invention may possibly be carried out in the presence of a catalyst. Example of catalysts which may be used are tertiary amines, such as triethylamine or triethylenediamine, salts of carboxylic acids, such as potassium acetate or potassium benzoate or ammonium salts of carboxylic acids, such as tetraethylammonium acetate or tetramethylammonium benzoate. The catalyst may be introduced into the reaction mixture from the start of the polymerization reaction or during the polymerization reaction, preferably at molar concentrations of less than 2% of the initial concentration.

In the process according to this invention, the reagents may be used in any isocyanate/onium cyanate ratio; however it is advantageous that this ratio be comprised between about 10 and 0.2 and, preferably, between about 2.5 and 0.4.

The reaction temperature is normally comprised between $-80°$ C. and $+150°$ C. and preferably between $-20°$ C. and $100°$ C. In fact, the selection of the temperature should be made in accordance with the reactivity of the isocyanate, the possible presence of catalysts and the desired features of the product.

The pressure has no influence on the production of organic salts of the polyisocyanates according to this invention. A pressure different from the atmospheric pressure is only used for maintaining the solvent liquid, for facilitating the flow of the fluids or for another purpose.

The time needed for the reaction depends from the reactivity of the system and from the features of the desired product. In some cases, reaction times of one minute are sufficient. Preferably the reaction time is comprised between 0.5 minute and 48 hours.

The polymers of the formulae (I), (IV) and (V) obtained by the process according to the invention may be isolated by evaporation or distillation of the solvent, by filtration, by centrifugation or by extraction with a solvent.

The molecular weight of the new polymers represented by the formulae (I), (IV) and (V) may be of more than 100,000. These polymers are soluble in many polar or non-polar solvents up to molecular weights of 100,000, so that the subsequent functionalization of these polymers is facilitated. The polymers according to the invention dissolve mineral salts, such as copper, nickel, cobalt and bismuth salts, in organic solvents, in which they are normally not soluble.

The polymers according to this invention have preferably a number of ionic isocyanurate rings which is higher than the number of molecular isocyanurate rings. This means that, in the average composition of the compounds of formulae (I), (IV) and (V), the value of n is higher than the value of a.

The new compounds according to this invention may be easily functionalized by means of coreagents which react with the ionic isocyanurate rings, such as for example the acids, the dimethyl sulfate, the allyl chloride, the acetyl chloride, the phthaloyl dichlorides, and/or the coreagents which react with the free isocyanate functions of the polymer, such as for example, the amines, the alcohols and the acids. This functionalization may be carried out by reaction of the new compounds according to the invention with the suitable coreagents. It can also be carried out by introducing the coreagent during the preparation of the compounds according to this invention.

EXAMPLES

The following purely illustrative examples show the preparation of the new compounds according to the invention and the use of these new compounds.

In these examples, the production of the new organic salts of polyisocyanates according to the invention and the applications of these new salts have been carried out in a discontinous manner in Grignard-type reactors. It is obvious that reactors working in a continous manner may also be used.

The average composition of the organic salts of polyisocyanates according to this invention, i.e. the average coefficient a, b and n of the general formula (I), has been determined from measures of the number of isocyanate functions in the polymer (titration amine-equivalent and infra-red), from the amount of unconverted cyanate salt (I.R. and potentiometric titration), from the number if ionic isocyanurate rings formed (potentiometric titration, I.R., RMN$^{13}$C) and from the number of non-ionic isocyanuric rings produced (I.R., RMN$^{13}$C). In fact, two of these measures are sufficient for determining the a and n parameters; the purpose of the other measures is to conform the composition. It is obvious that, as well as in other polymer productions, the average values result from the presence of polymers of different compositions in the mixture.

The aparatus used in all the examples is a glass reactor of 0.5 liters provided with four openings and equipped with a mechanical stirrer, a reflux condensor, a thermometer and a device for introducing the liquid. The temperature is controlled by means of a thermostat and the reactor is maintained under an atmosphere of an inert glass (nitrogen or argon).

EXAMPLE 1

11.4 g of tetrapropylammonium cyanate (0.05 mole) and 250 ml of anhydrous dichloromethane are introduced into the reactor. When the reagent is dissolved, 17.4 g of 2,4-tolylene diisocyanate (0.1 mole) are added to the mixture at a temperature of 25° C., while stirring this mixture. A very quick reaction takes place and, after 1 minute, the used onium cyanate and tolylene diisocyanate completely disappear. The obtained product, which is soluble in the solvent may be represented by the following formula (XIV):

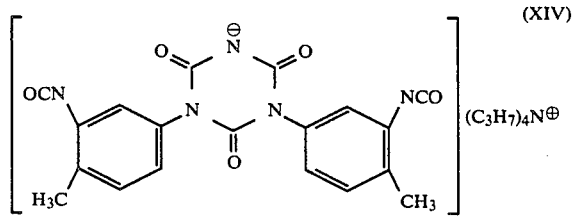

This product may be isolated by distillation under vacuum of the solvent, immediately after the reaction. 21.7 g of the product are obtained (yield: 94%).

EXAMPLE 2

17 g of tetraamylammonium cyanate (0.05 mole) and 250 ml of anhydrous dimethoxyethane are introduced into the reactor. The onium salt is only partially soluble in the solvent. Under stirring and at the temperature of 25° C., 17.1 g of 2,4-tolylene diisocyanate (0.1 mole) are added. The onium cyanate becomes dissolved when the 2,4-tolylene diisocyanate is added. After ten minutes of reaction, the formed precipitate is filtered, washed with ether and dried. 33 g (yield: 97%) of a solid product are obtained. This product is soluble in dichloromethane or chloroform. It has been submitted to a chemical anaylsis, to I.R. spectrophotometry and to the RMN test of $^{13}$C.

The results show that the product is a mixture of 85% by weight of a compound of the following formula (XV):

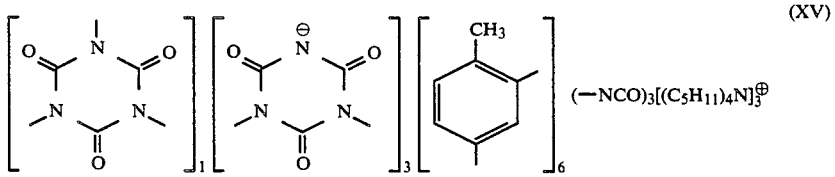

and of 15% of higher polymers.

The differential thermal analysis of the product shows a first endothermic wave at about 240° C. and a second wave centered on 280° C.

EXAMPLE 3

22.8 g of tetrapropylammonium cyanate (0.1 mole) and 250 ml of anhydrous dichloromethane are introduced into the reactor. To the obtained solution, 17.4 g (0.1 mole) of 2,4-tolylene diisocyanate are added at a temperature of 25° C., while stirring the reaction medium. After 3 hours of reaction at 25° C., a polymer which is soluble in the solvent and has the average following composition is obtained:

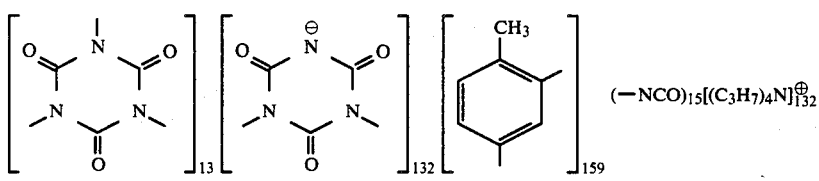

The molecular weight of this polymer is of more than 50,000.

When the polymerization is continued, the product gels after six hours of reaction.

EXAMPLE 4

The reaction is carried out as described in example 3, except that 0.1 mole of tetraamylammonium cyanate is used. The reaction is slower and gives, after 24 hours, a soluble polymer having the following average composition:

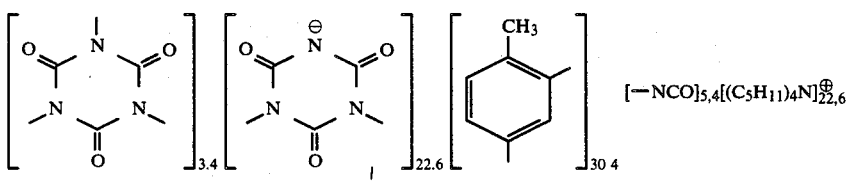

EXAMPLE 5

The reaction is carried out as described in example 3, except that acetone is used as solvent. In this polar solvent, which has a dielectric constant of more than 15, the gelling of the product is very quick, since this gelling takes place after 4 minutes of reaction, so that the possibilities of functionalization of the product are decreased.

EXAMPLE 6

27.8 g of tetrapropylammonium cyanate and 250 ml of anhydrous dichloromethane are introduced into the reactor. When the reagent is dissolved, 34.8 g of 1,3-bis-(3-isocyanato-4-methylphenyl)uretidinedione are added to the stirred reaction mixture at a temperature of 25° C. After 20 minutes of reaction the solvent is evaporated under vacuum. 56.5 g of compound of formula (XIV) of example 1 (yield 98%) are isolated.

EXAMPLE 7

42.5 g of tetraphenylarsonium cyanate (0.1 mole) and 250 ml of anhydrous dichloromethane are introduced into the reactor. When the cyanate is dissolved, 17.4 g of 2,4-tolylene diisocyanate (0.1 mole) are added to the stirred reaction medium at 25° C. After two hours of reaction at a temperature of 25° C. the insoluble polymer (24.1 g) is isolated. This polymer contains 0.8 milliequivalent of charged rings per g of polymer.

EXAMPLE 8

30.1 g (0.1 mole) of tetrabutylphosphonium cyanate and 250 m of anhydrous dichloromethane are introduced into the reactor. When the cyanate is dissolved, 17.4 g of a 80:20 mixture of TDI (0.1 mole) are added to the stirred reaction medium at a temperature of 30° C. The polymer is isolated after 400 minutes of reaction at 30° C. 39 g of a polymer having an average molecular weight of 5,200 are obtained. This polymer contains 5.8 ionic isocyanurate rings per molecule.

EXAMPLE 9

A quaternary polyammonium cyanate is prepared from 100 g of anion exchange resin of the Amberlite-IRA 400 type in the $Cl^-$ form. The exchange between the $Cl^-$ and $NCO^-$ anions is carried out by contacting the resin with a saturated solution of sodium cyanate.

After washing with methanol and acetone, the anydrous resin in the $NCO^-$ form is obtained. This resin contains 0.067 equivalent of $NCO^-$ ions per gram of resine.

The resin is introduced together with 100 ml of anydrous dichloromethane into the reactor 0.67 mole of 2,4-toluene diisocyanate are added to the stirred suspension at a temperature of 25° C. The stirred mixture is maintained under reflux during 5 hours. After evaporation of the solvent, 209 g of a solid consisting of a copolymer of the starting resin and of partially charged polyisocyanurate is recovered.

EXAMPLES 10 to 28

The following table I shows the results obtained under various conditions. This table shows the initial concentrations of the reagents (columns 2 and 3), the temperature and the time or duration of the reaction (columns 4 and 5), the used solvent (column 6) as well as the molecular weight of the product and its content in ionic isocyanuric rings expressed in milliequivalents per gram (columns 7 and 8).

TABLE I

| 1 No Ex. | 2 $C_{TDI}$ mole/l | 3 $C_{QNCO}^*$ mole/l | 4 T °C. | 5 t min | 6 S** | 7 PM | 8 milli-eq./g |
|---|---|---|---|---|---|---|---|
| 10 | 0.3 | 0.3(1) | 25 | 360 | $CH_2Cl_2$ | 110,000 | 2.28 |
| 11 | 0.3 | 0.3(2) | 25 | 600 | " | 33,000 | 1.82 |
| 12 | 0.3 | 0.3(3) | 25 | 150 | " | 14,000 | 2.10 |
| 13 | 0.3 | 0.3(4) | 25 | 400 | " | 4,000 | 1.75 |
| 14 | 0.3 | 0.3(5) | 50 | 3 | " | 8,000 | 0.90 |
| 15 | 0.3 | 0.5(4) | 25 | 800 | " | 13,000 | 1.75 |
| 16 | 0.3 | 0.15(4) | 25 | 2 | " | 1,040 | 1.38 |
| 17 | 0.4 | 0.4(1) | 50 | 60 | " | 45,000 | 1.95 |
| 18 | 0.4 | 0.2(2) | 0 | 5 | " | 928 | 1.60 |
| 19 | 0.3 | 0.3(2) | 25 | 2 | " | 1,460 | 1.55 |
| 20 | " | " | " | 20 | " | 2,620 | 1.70 |
| 21 | " | " | " | 40 | " | 3,360 | 1.74 |
| 22 | " | " | " | 200 | " | 8,750 | 1.84 |
| 23 | " | " | " | 260 | " | 17,500 | 1.87 |
| 24 | 0.35 | 0.35(1) | 25 | 100 | DMF | 20,000 | 2.13 |
| 25 | " | " | 35 | 200 | 1.2 DCE | 11,000 | 1.80 |

TABLE I-continued

| 1 No Ex. | 2 $C_{TDI}$ mole/l | 3 $C_{QNCO}*$ mole/l | 4 T °C. | 5 t min | 6 S** | 7 PM | 8 milli- eq./g |
|---|---|---|---|---|---|---|---|
| 26 | " | 0.35(2) | 25 | 250 | 1.1 DCE | 15,000 | 1.60 |
| 27 | 0.2 | 0.1(3) | 20 | 10 | ethyl acetate | 1,300 | 1.48 |
| 28 | nbr mole TDI | nbr mole QNCO (2) | | | | | |
| | 1 | 0.5 | 20 | 10 | — | 6,200 | 0.75 |

*Q(1) = $(C_3H_7)_4N^+$; (2) = $(C_4H_9)_4N^+$; (3) = $C_6H_5CH_2N^+(C_2H_5)_3$; (4) = $(C_5H_{11})_4N^+$; (5) = $(C_2H_5)_4N^+$
**DMF = dimethylformamide; 1,2 DCE = 1,2-dichlorethane; 1,1 DCE = 1,1-dichlorethane.

EXAMPLE 29

The product of the formula (XII) (0.05 mole), prepared as described in example 1, is reacted with triethanolamine (0.05 mole) in 0.25 l of dichloromethane at a temperature of 25° C. After one hour of reaction, more than 98% of the initialy present isocyanate functions have disappeared. 30.3 g of a solid (yield 85% are obtained after distillation under vacuum. The chemecal analysis (I.R. spectrophotometry and RMN) shows that the product is a polymer containing ionic isocyanurate functions and urethane links as shown by the following formula (XVIII):

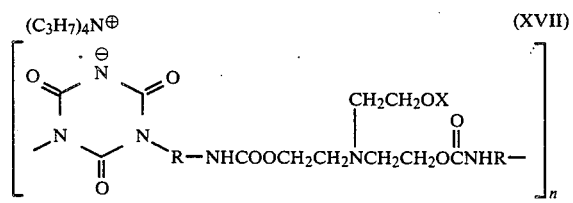

(XVII)

in which R is the radical of formula

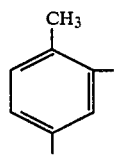

and X represents either H or a new polymer chain.

The polymer contains 1.36 equivalents of ionic isocyanurate functions and 1.13 equivalents of tertiary amino functions per kg. The polymer is insoluble in water; it is soluble in acetonitrile, N,N-dimethylformamide and methanol.

EXAMPLE 30

The polymerization reaction is carried out as described in example 3. After 3 hours of reaction, 1.13 g of NiCl₂ (which is insoluble in dichloromethane) are introduced into the stirred reaction mixture. After 5 minutes, the total amount of the introduced salt becomes dissolved. A precipitate is obtained after 30 minutes. 35.2 g of a solid are obtained after filtration, washing with ether and drying.

This solid is a polymer containing all the introduced nickel and having the following composition (formula XIX):

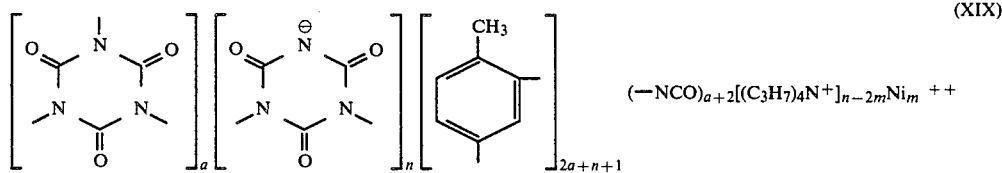

(XIX)

$(-NCO)_{a+2}[(C_3H_7)_4N^+]_{n-2m}Ni_m^{++}$ in which $a > 13$, $n > 100$ and $m > 0$

EXAMPLE 31

The reaction is carried out as described in example 3. After 5 hours of reaction, 100 g of a polymer having a molecular weight of 3,500, resulting from the reaction of glycerol with propylene oxide and ethylene oxide (Tercarol 305 of Société CARBOCHIMIQUE, Belgium, having a hydroxy index of 48) are added to the reaction mixture. The obtained polymer contains molecular isocyanurate, ionic isocyanurate and urethane functions. It is soluble in dichloromethane and in water.

EXAMPLE 32

The reaction is carried out as described in example 3. After 5 hours of reaction, 6.5 g of allyl chloride are added to the reaction mixture which is then maintained under reflux during 10 hours. 32.5 g of a polymer are obtained after distillation of the solvent and washing of the obtained solid with water. In this polymer 45% of the ionic isocyanuric rings present in the initial polymer have been converted into allylisocyanurates.

EXAMPLES 33 to 42

The following table II shows the results obtained under various conditions by reaction of TDI with an onium cyanate (QNCO) in the presence of an alkylation agent (RX).

The onium cyanate is progressively added either in solid form or dissolved in an organic solvent as shown in table II, to the solution containing the TDI, the alkylation agent and the possible solvent.

The obtained polymers are molecular and contain asymetrical isocyanuric rings and possibly symetrical isocyanuric rings.

In said table II, the initial number of moles of the reagents is shown in columns 2, 3 and 4, the temperature in column 5, the reaction duration in column 6, the volume of used solvent in column 7 and the isocyanate contents (expressed in moles) in column 8, the TDI contents after reaction ($TDI_t$) in column 9, the asymetrical isocyanuric ring content (IA) in column 10 and the methyl isocyanate contents in column 11 of the final reaction mixture.

TABLE II

| 1 No ex | 2 TDI (moles) | 3 QNCO* (moles) | 4 RX** (moles) | 5 T (°C.) | 6 t (min.) | 7 S*** (ml) | 8 Equivalents of isocyanate functions | 9 TDI$_t$ (moles) | 10 IA (moles) | 11 CH$_3$NCO (moles) |
|---|---|---|---|---|---|---|---|---|---|---|
| 33 | 0.382 | 0.198(1)(9) | 0.192(4) | 25 | 5 | 50(6) | 0.422 | 0.026 | 0.178 | 0.014 |
| 34 | 4.268 | 2.134(1)(9) | 2.134(4) | 25 | 5 | 500(6) | 5.04 | 0.458 | 1.86 | 0.274 |
| 35 | 0.853 | 0.427(1)(9) | 0.427(4) | 25 | 5 | 80(6) | 0.928 | 0.050 | 0.402 | 0.025 |
| 36 | 0.853 | 0.427(2)(9) | 0.427(4) | 40 | 5 | 80(6) | 0.935 | 0.047 | 0.409 | 0.023 |
| 37 | 0.840 | 0.420(3)(9) | 0.420(4) | 25 | 5 | 80(6) | 0.900 | 0.030 | 0.412 | 0.015 |
| 38 | 0.854 | 0.427(1)(7) | 0.427(4) | 25 | 5 | 100(7) | 0.947 | 0.062 | 0.396 | 0.031 |
| 39 | 0.850 | 0.425(2)(7) | 0.425(4) | 30 | 5 | 100(7) | 0.940 | 0.056 | 0.400 | 0.028 |
| 40 | 0.850 | 0.425(1)(8) | 0.425(5) | 30 | 5 | 100(8) | 0.930 | 0.041 | 0.400 | 0.021 |
| 41 | 8.000 | 0.636(1)(9) | 0.636(4) | 30 | 5 | — | 14.800 | 6.770 | 0.610 | 0.026 |
| 42 | 8.000 | 0.640(1)(9) | 0.640(4) | 30 | 5 | — | 14.700 | 6.720 | 0.620 | 0.020 |

*Q: (1)triethylbenzylammonium, (2) tributylbenzylammonium, (3) tetrapropylammonium, (9) addition of the QNCO in solid form. The nature of the solvent in which the QNCO is possibly dissolved (saturated solution) is given by the second figure between brackets in column 3.
**RX: (4) dimethylsulfate, (5) methyl iodide
***S: (6) ethylmethylketone (butanone-2), (7) dichloromethane, (8) acetonitrile.

EXAMPLE 43

The reaction is carried out as described in example 34. After 5 minutes of reaction, part of the solvent (butanone-2) and the methyl isocyanate are distilled under vacuum. 4.186 moles of isocyanate functions remain in the reaction mixture after the distillation.

The reaction mixture is then introduced into a reactor of 4 liters provided with four openings equipped with a mechanical stirrer, a reflux condensor, a thermometer and a device for introducing a liquid. The temperature is maintained at 25° C. This reaction mixture is contacted with 0.698 mole of trimethylolpropane of the following formula (XX) dissolved in 2 liters of butanone-2.

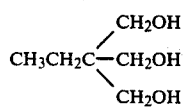
(XX)

After 5 hours of reaction, more than 98% of the initially present hydroxy functions have disappeared.

The so formed polymer is entirely soluble in butanone-2 up to contents of 70% by weight.

EXAMPLE 44

0.5 equivalents of triethylbenzylammonium cyanate in solid form are gradually added to a solution containing 10 equivalents of MDI ("Tercarate B01" of Société CARBOCHIMIQUE containing 31.5% by weight of isocyanate functions) and 0.5 equivalents of dimethyl sulfate. A reaction product containing 0.5 mole of moleculer isocyanurate rings is obtained. This solution has been used for preparing a rigid polyurethane foam having a density of 35 kg/m³.

We claim:

1. An organic salt of a polyisocyanate containing at least one negatively charged isocyanurate ring and at least one positively charged non-metal ion, said salt having the following general formula (I):

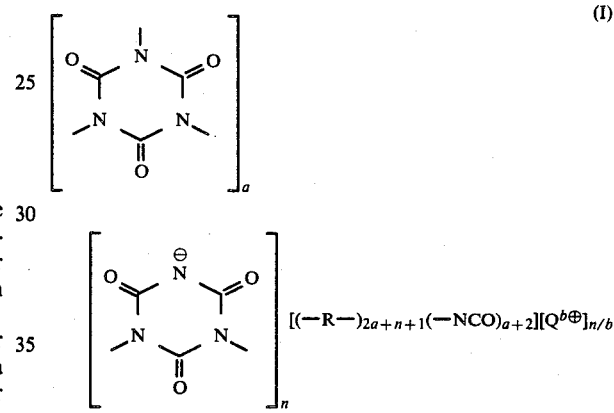

in which
R is a bivalent radical selected from the group consisting of lower alkylene, lower cycloalkylene, phenylene, naphthylene, stilbene, isophorone and diphenylene-lower alkylene which is or is not substituted by lower alkyl groups;
Q is an ammonium, arsonium or phosphonium cation which is tetrasubstituted by identical or different radicals, said tetrasubstituted ammonium, arsonium or phosphonium cation being selected from the group consisting of radicals of the following formulae:

(II)

and

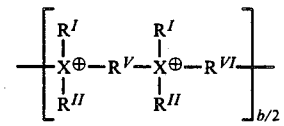
(III)

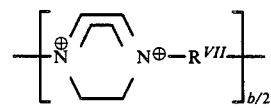
(IV)

in which

X is nitrogen, phosphorus or arsenic;

$R^I$, $R^{II}$, $R^{III}$ and $R^{IV}$ which are identical or different represent a lower alkyl, phenyl, phenyl-lower alkyl or phenylene di-lower alkyl radical, whereby $R^{IV}$ may represent a polyvalent radical and two or three of $R^I$, $R^{II}$, $R^{III}$ and $R^{IV}$ may be joined to form with one or two nitrogen atoms a di-lower alkyl piperidinium radical, a lower alkyl pyridinium radical or a di-lower alkyl triethylene diammonium radical.

$R^V$ and $R^{VI}$ which are identical or different represent a lower alkylene or phenyl di-lower alkylene radical; and $R^{VII}$ represents a lower alkylene radical or mixtures of said cations;

a is the average number of molecular isocyanurate rings which may be equal to zero or have a value from 1 to 500;

b is the number of tetrasubstituted heteroatoms of Q having a value from 1 to 100, and n is the average number of ionic isocyanurate rings having a value from 1 to about 3000.

2. An organic salt of a polyisocyanurate according to claim 1, in which in the formula (I), R represents a phenylene radical which may be substituted by a lower alkyl group and, in the tetrasubstituted ammonium, phosphonium or arsonium radicals represented by the formulae II and III, $R^I$, $R^{II}$, $R^{III}$, $R^{IV}$, $R^V$, $R^{VI}$, a, b and n have the meanings given in claim 1.

3. A process for preparing an organic salt of a polyisocyanate containing at least one negatively charged isocyanurate ring and at least one positively charged non-metal ion according to any one of claims 1 and 2, in which a cyanate of the general formula (VI):

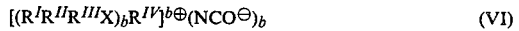

$$[(R^I R^{II} R^{III} X)_b R^{IV}]^{b\oplus}(NCO^\ominus)_b \quad (VI)$$

or of the following general formula (VII):

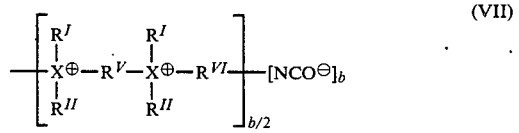

(VII)

in which X, $R^I$, $R^{II}$, $R^{III}$, $R^{IV}$, $R^V$ and $R^{VI}$ have the meanings set forth in claim 1, is reacted with a compound selected from the group consisting of organic polyisocyanates of the following general formula (VIII):

$$R(NCO)_m \quad (VIII)$$

in which R has the meaning set forth in claim 1 and m is equal to at least 2, and 1,3-bis(isocyanatoaryl)uretidinediones of the following general formula (IX):

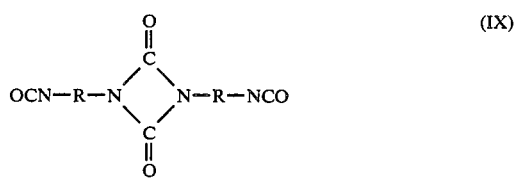

(IX)

in which R represents an aryl radical.

4. A process according to claim 3, in which an organic diisocyanate of the following general formula:

OCN—R—NCO in which R represents a lower alkylene, lower cycloalkylene, phenylene, naphthylene, stilbene, isophorone or diphenylene-lower alkylene radical possibly substituted by lower alkyl groups or a mixture of such organic diisocyanates is used.

5. A process according to claim 3, in which an organic diisocyanate selected from the group consisting of 2,4-tolylene diisocyanate, 2,6-tolylene diisocyanate and mixtures thereof is used.

6. A process according to claim 3, in which an organic diisocyanate consisting of 1,3-bis-(3-isocyanato-4-methylphenyl)uretidinedione is used.

7. A process according to claim 3, in which the cyanate of the formula (VI) or (VII) is reacted, at a temperature between $-20°$ C. and $100°$ C., with 0.2 to 10 moles of an organic diisocyanate per mole of cyanate, in the presence of 0.05 to 2 liters, per mole of diisocyanate, of an inert organic solvent, during 0.5 minute to 48 hours.

8. A process according to claim 7, in which a solvent dissolving at least 10 g of cyanate of the formula (VI) or (VII) per kg of solvent at the reaction temperature is used.

9. A process according to claim 7, in which a solvent in which the reagents are entirely dissolved after about 5 minutes of reaction is used.

10. A process according to claim 7, in which a solvent having a dielectric constant of less than 15 at $25°$ C. is used.

11. A process according to claim 7, wherein a solvent selected from the group consisting of dichloromethane, 1,2-dichloroethane, chloroform, trichlorethylene, 1,1-dichlorethylene, dimethylether, dimethoxyethane, methyl acetate, tetrahydrofuran, ethyl acetate, dioxane, diethylether, pyridine, o-dichlorobenzene, chlorobenzene, benzene, toluene, xylenes, $\alpha$-methylnaphthalene, butyl acetate, diisopropylether, dimethylformamide and diphenylether is used.

12. A process according to claim 7, in which a catalyst selected from the group consisting of tertiary amines, metal salts of carboxylic acids and tetrasubstituted ammonium salts of carboxylic acids is used.

13. A process according to claim 3, in which the cyanate of the formula (VI) or (VII) is one member selected from the group consisting of tetramethylammonium cyanate, tetraethylammonium cyanate, tetrapropylammonium cyanate, tetrabutylammonium cyanate, tetraamylammonium cyanate, tetrahexylammonium cyanate, tributylmethylammonium cyanate, tricaprylmethylammonium cyanate, benzyltrimethylammonium cyanate, benzyltriethylammonium cyanate, benzyltributylammonium cyanate, dodecyltrimethylammonium cyanate, benzylisopropyldimethylammonium cyanate, benzyltripropylammonium cyanate, phenyltrimethylammonium cyanate, phenyltriethylammonium cyanate, methyltributylphosphonium cyanate, tetrabutylphosphonium cyanate, tetraphenylphosphonium cyanate, benzyltriethylarsoniumcyanate, tetrapropylarsonium cyanate, tetraphenylarsonium cyanate, dimethylpiperidinium cyanate, methylpyridinium cyanate and mixtures of at least two of said cyanates.*

14. A process according to claim 3, in which the cyanate is one member selected from the group consisting of the cyanate of 1,4-bis-(tri-methylammonium)butane, the cyanate of 1,6-bis-(triethylammonium)-hexane, the cyanate of 1,4-dimethyl-1,4-diaza-2,2,2 bicyclooctane, the ionene of the following formula (XII):

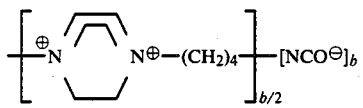
(XII)

and the ionene of the following formula (XIII):

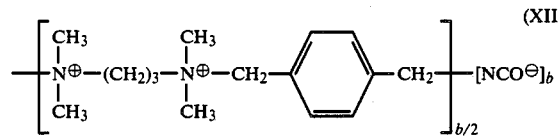
(XIII)

wherein b is a numeral of 5 to 40, and a mixture of at least two of said cyanates.

15. A process according to claim 3, in which the 1,3-bis(isocyanatoaryl)uretidinedione of the formula (IX) is one member selected from the group consisting of 1,3-bis(3-isocyanato-4-methyl-phenyl)-uretidinedione and 1,3-bis(4-isocyanatophenyl)-uretidinedione.

16. A process for preparing a derivative of the organic salt of a polyisocyanate according to claim 1, in which a co-reagent capable of reacting with at least a part of the ionic isocyanurate rings and/or the free isocyanate groups is present.

17. A process according to claim 16, in which the co-reagent is selected from the group consisting of lower aliphatic carboxylic acids, lower alkyl sulphates or halides, lower alkylene halides, halides of mono-or di-carboxylic lower aliphatic acids, alkylamines and aliphatic alcohols.

18. A process for preparing a derivative of an organic salt of a polyisocyanate according to claim 1, in which a cyanate of the general formula (VI):

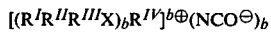
(VI)

or of the following general formula (VII):

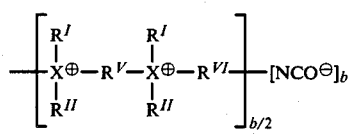
(VII)

in which $X$, $R^I$, $R^{II}$, $R^{III}$, $R^{IV}$, $R^V$ and $R^{VI}$ have the meanings set forth in claim 1, is reacted with a compound selected from the group consisting of organic polyisocyanates of the following general formula (VIII):

$$R(NCO)_m \qquad (VIII)$$

in which R has the meaning set forth in claim 1 and m is equal to at least 2, and 1,3-bis(isocyanatoaryl)uretidinediones of the following general formula (IX):

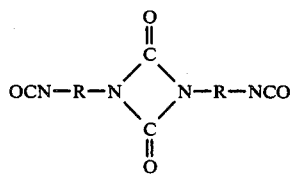
(IX)

in which R represents an aryl radical, in the presence of a co-reagent capable of functionalizing at least a part of the formed isocyanurate rings and/or the free isocyanate functions.

19. A process according to claim 18, in which the co-reagent is selected from the group consisting of lower aliphatic carboxylic acids, lower alkyl sulphates or halides, lower alkylene halides, halides of mono-or di-carboxylic lower aliphatic acids and lower alkylamines.

* * * * *